United States Patent
Sbriglia

(10) Patent No.: US 10,808,058 B2
(45) Date of Patent: Oct. 20, 2020

(54) METHOD FOR PRODUCING POROUS ARTICLES FROM ALTERNATING POLY(ETHYLENE TETRAFLUOROETHYLENE) AND ARTICLES PRODUCED THEREFROM

(71) Applicant: W. L. Gore & Associates, Inc., Newark, DE (US)

(72) Inventor: Guy A. Sbriglia, Christiana, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 730 days.

(21) Appl. No.: 14/950,657

(22) Filed: Nov. 24, 2015

(65) Prior Publication Data
US 2016/0090430 A1    Mar. 31, 2016

Related U.S. Application Data

(63) Continuation of application No. 14/811,510, filed on Jul. 28, 2015, now Pat. No. 9,932,429.
(Continued)

(51) Int. Cl.
*C08F 214/26* (2006.01)
*B29C 43/24* (2006.01)
(Continued)

(52) U.S. Cl.
CPC .......... *C08F 214/265* (2013.01); *B01D 71/32* (2013.01); *B29C 43/003* (2013.01);
(Continued)

(58) Field of Classification Search
CPC . C08F 214/265; B01D 71/32; B29C 43/0003; B29C 43/24; B29C 47/0004; B29C 47/0011; B29C 47/92
See application file for complete search history.

(56) References Cited

U.S. PATENT DOCUMENTS 3,929,950 A    12/1975 Nakamura et al.
4,187,390 A    2/1980 Gore
(Continued)

FOREIGN PATENT DOCUMENTS

CN    102189609 A  *  9/2011
CN    103275386       9/2013
(Continued)

OTHER PUBLICATIONS

De Focatiis et al. Uniaxial deformation and orientation of ethylene-tetrafluoroethylene films, Polymer Testing, 32, 2013, pp. 1423-1435. (Year: 2013).*
(Continued)

*Primary Examiner* — Kelly M Gambetta
(74) *Attorney, Agent, or Firm* — Amy L. Miller

(57) ABSTRACT

Poly(ethylene tetrafluoroethylene) (ETFE) polymers having an average molecular weight of at least 300,000 g/mol and a melt enthalpy of at least 57 J/g are provided. The ETFE polymer may include at least one additional comonomer. The ETFE polymer is used to form a porous tape or membrane that has a node and fibril structure. A porous ETFE tape may be formed by lubricating the ETFE polymer and subjecting the lubricated polymer to pressure at a temperature below the melting point of the ETFE polymer. Optionally, the ETFE tape may be expanded at a temperature below the melting temperature of the ETFE polymer to form an expanded ETFE membrane. Alternatively, the ETFE polymer may subjected to heat and pressure without the addition of a lubricant to form a dense preform. The dense preform may be subsequently slit in a length direction and stretched to form a dense ETFE fiber.

11 Claims, 7 Drawing Sheets

Related U.S. Application Data

(60) Provisional application No. 62/030,448, filed on Jul. 29, 2014.

(51) Int. Cl.

| | | |
|---|---|---|
| *B29C 51/26* | (2006.01) | |
| *B29C 48/04* | (2019.01) | |
| *B29C 48/00* | (2019.01) | |
| *B29C 48/92* | (2019.01) | |
| *B29C 43/00* | (2006.01) | |
| *B01D 71/32* | (2006.01) | |
| *H01M 2/16* | (2006.01) | |
| *B29C 55/00* | (2006.01) | |
| *B29D 99/00* | (2010.01) | |
| *B29K 27/12* | (2006.01) | |
| *B29L 7/00* | (2006.01) | |
| *B29K 105/04* | (2006.01) | |
| *B29C 55/02* | (2006.01) | |

(52) U.S. Cl.
CPC ............ *B29C 43/24* (2013.01); *B29C 48/022* (2019.02); *B29C 48/04* (2019.02); *B29C 48/92* (2019.02); *B29C 51/266* (2013.01); *B29C 55/005* (2013.01); *B29D 99/0078* (2013.01); *C08F 214/26* (2013.01); *H01M 2/1653* (2013.01); *B29C 55/02* (2013.01); *B29C 2948/926* (2019.02); *B29C 2948/92514* (2019.02); *B29C 2948/92685* (2019.02); *B29C 2948/92704* (2019.02); *B29K 2023/06* (2013.01); *B29K 2027/12* (2013.01); *B29K 2105/04* (2013.01); *B29K 2995/0041* (2013.01); *B29K 2995/0088* (2013.01); *B29L 2007/007* (2013.01); *B32B 2327/12* (2013.01)

(56) References Cited

U.S. PATENT DOCUMENTS

| | | | |
|---|---|---|---|
| 4,342,636 A | 8/1982 | Chang et al. | |
| 4,623,670 A | 11/1986 | Mutoh et al. | |
| 4,702,836 A | 10/1987 | Mutoh et al. | |
| 4,910,106 A | 3/1990 | Kafchinski et al. | |
| 4,997,603 A | 3/1991 | Kafchinski et al. | |
| 5,043,113 A | 8/1991 | Kafchinski et al. | |
| 5,198,162 A * | 3/1993 | Park ..................... C08J 9/26 264/41 |
| 5,358,780 A | 10/1994 | Kafchinski et al. | |
| 5,712,315 A | 1/1998 | Dolan | |
| 6,559,192 B2 | 5/2003 | Maccone et al. | |
| 8,802,968 B2 * | 8/2014 | Aruga ..................... B32B 7/12 136/251 |
| 2002/0128412 A1 * | 9/2002 | Kitahara ............... B32B 27/38 526/250 |
| 2007/0196638 A1 | 8/2007 | Wei et al. | |
| 2009/0181216 A1 * | 7/2009 | Peng ..................... B32B 27/30 428/192 |
| 2011/0076440 A1 * | 3/2011 | Steeman ............... B29C 43/22 428/98 |
| 2011/0178193 A1 | 7/2011 | Iruya et al. | |

FOREIGN PATENT DOCUMENTS

| | | |
|---|---|---|
| CN | 103811700 | 5/2014 |
| EP | 2338933 | 6/2011 |
| JP | 2001002815 | 1/2001 |
| JP | 2007308724 | 11/2007 |
| KR | 10-2011-0138247 A | 12/2011 |
| KR | 10-2013-0140887 A | 12/2013 |
| KR | 10-2014-0074714 A | 6/2014 |
| KR | 10-2014-0074755 A | 6/2014 |

OTHER PUBLICATIONS

Arai et al., Influence of Alternating Sequential Fraction on the Melting and Glass Transition Temperatures of Ethylene-Tetrafluoroethylene Copolymer, Elsecier Ltd., Polymer 51, pp. 4831-4835, 2010.

Tuminello et al., Rheological Molecular Weight Distribution Determinations of Ethiene/Tetrafluoroethylene Copolymers: Implications for Long-Chain Branching, American Chemical Society, Macromolecules 26, 499-503, 1993.

* cited by examiner

METHOD FOR PRODUCING POROUS ARTICLES FROM ALTERNATING POLY(ETHYLENE TETRAFLUOROETHYLENE) AND ARTICLES PRODUCED THEREFROM

FIELD

The present invention relates generally to poly(ethylene tetrafluoroethylene), and more specifically, to a process for the formation of porous articles from a highly crystalline high molecular weight poly(ethylene tetrafluoroethylene) polymer.

BACKGROUND

Ethylene-tetrafluoroethylene (ETFE)-based polymers are known in the art, and are used as linings or coatings. However, ETFE polymers are difficult to manufacture, and even more difficult to process. Thus, there exists a need in the art for a process for making an ETFE article that is processed below the melt, has high strength, is highly porous, and which may be processed into a dense form.

SUMMARY

One embodiment relates to a method of making a porous poly(ethylene tetrafluoroethylene) (ETFE) tape that includes (1) lubricating a poly(ethylene tetrafluoroethylene) polymer that has an average molecular weight of at least 300,000 g/mol to form a lubricated polymer and (2) subjecting the lubricated polymer to pressure at a temperature below the melting point of the poly(ethylene tetrafluoroethylene) polymer to form a porous ETFE tape. In one embodiment, the lubricated polymer is ram extruded at a temperature that is about 220° C. or less below the melt temperature of the ETFE polymer. The ETFE tape has a node and fibril structure and a porosity greater than about 10%. Additionally, the ETFE polymer has a melt enthalpy of at least 57 J/g. In some embodiments, the ETFE polymer may include from about 0.001 mol % to about 10 mol % of an additional monomer.

A second embodiment relates to a porous ETFE article that includes a porous tape formed from an ETFE polymer that has an average molecular weight of at least about 300,000 g/mol and a melt enthalpy of at least 57 J/g. The tape has a node and fibril structure. The ETFE polymer may include from about 0.001 mol % to about 10 mol % of an additional monomer. Additionally, the ETFE tape has a thickness from about 0.01 mm to about 4 mm and a porosity greater than about 10%.

A third embodiment relates to a porous ETFE article that includes a porous tape formed from an ETFE polymer that has an average molecular weight of at least about 300,000 g/mol. In some embodiments, the ETFE polymer includes from about 0.001 mol % to about 10 mol % of an additional monomer. In addition, the ETFE polymer has a melt enthalpy of at least 57 J/g. Further, the ETFE tape has a porosity greater than about 10%.

A fourth embodiment relates to a method of making a porous poly(ethylene tetrafluoroethylene) (ETFE) membrane that includes (1) lubricating a poly(ethylene tetrafluoroethylene) polymer that has an average molecular weight of at least 300,000 g/mol to form a lubricated polymer, (2) subjecting the lubricated polymer to pressure at a temperature below the melting point of the poly(ethylene tetrafluoroethylene) polymer to form a preform, and (3) expanding the preform at a temperature below the melt temperature of the poly(ethylene tetrafluoroethylene) polymer to form a porous article. The ETFE article has a structure of nodes and fibrils. In at least one embodiment, the lubricated ETFE polymer is ram extruded at a temperature that is about 220° C. or less below the melt temperature of the ETFE polymer. The lubricant may be removed from the preform prior to expanding. The ETFE polymer has a melt temperature from about 260° C. to about 300° C.

A fifth embodiment relates to a process for manufacturing porous ETFE membranes that includes subjecting a lubricated poly(ethylene tetrafluoroethylene) (ETFE) polymer having an average molecular weight of at least 300,000 g/mol and a melt enthalpy of at least 57 J/g to pressure and heat below the melt temperature of the ETFE polymer to form a tape, followed by expansion of the tape below the melt temperature of the ETFE polymer to form a porous membrane. The subjecting step may include ram extruding the lubricated ETFE polymer at a temperature that is about 220° C. or less below the melt temperature of the ETFE polymer. The EFTE tape may optionally be calendered at a temperature that is about 220° C. or less below the melt temperature of the ETFE polymer. In exemplary embodiments, the average molecular weight of the ETFE polymer is between about 300,000 g/mol and about 20,000,000 g/mol. In addition, the ETFE polymer may include at least one additional comonomer.

A sixth embodiment relates to a porous ETFE article that includes a porous membrane formed from an ETFE polymer having, an average molecular weight of at least about 300,000 g/mol and a melt enthalpy of at least 57 J/g. The porous ETFE membrane has a node and fibril structure. The ETFE membrane may have a thickness less than about 1 mm.

A seventh embodiment relates to a process for making a dense ETFE polymer article that includes calendering a poly(ethylene tetrafluoroethylene) (ETFE) polymer having an average molecular weight greater than about 300,000 glmol and a melt enthalpy of at least 57 J/g at a temperature that is about 220° C. or less below the melt temperature of the ETFE polymer. In at least one embodiment, the calendering occurs in the absence of a lubricant. The ETFE polymer has a melt temperature from about 260° C. to about 300° C. The ETFE polymer article has a porosity less than about 10%.

An eighth embodiment relates to a dense ETFE polymer article that includes an ETFE polymer preform that has a porosity less than about 10%. The ETFE polymer has an average molecular weight greater than about 300,000 g/mol and a melt enthalpy of at least 57 J/g. In one embodiment, the dense ETFE polymer article is in the form of a fiber. In an alternate embodiment, the EFTE polymer preform is in the form of a tape.

A ninth embodiment relates to method for making an ETFE copolymer fiber that includes (1) subjecting an ETFE copolymer having an average molecular weight greater than about 300,000 g/mol and a melt enthalpy of at least 57 g/mol to pressure at a first temperature that is about 220° C. or less below the melt temperature of the ETFE polymer to form a preform, (2) slitting the preform in a length direction, and (3) stretching the slit preform into an ETFE polymer fiber at a second temperature that is about 220° C. or less below the melt temperature of the ETFE polymer. The ETFE polymer fiber has a porosity less than about 10%. In at least one embodiment, the ETFE polymer includes from about 0.001 mol % to about 10 mol % of an additional comonomer.

BRIEF DESCRIPTIONS OF DRAWINGS

The accompanying drawings are included to provide a further understanding of the disclosure and are incorporated in and constitute a part of this specification, illustrate embodiments, and together with the description serve to explain the principles of the disclosure.

Figure 6:
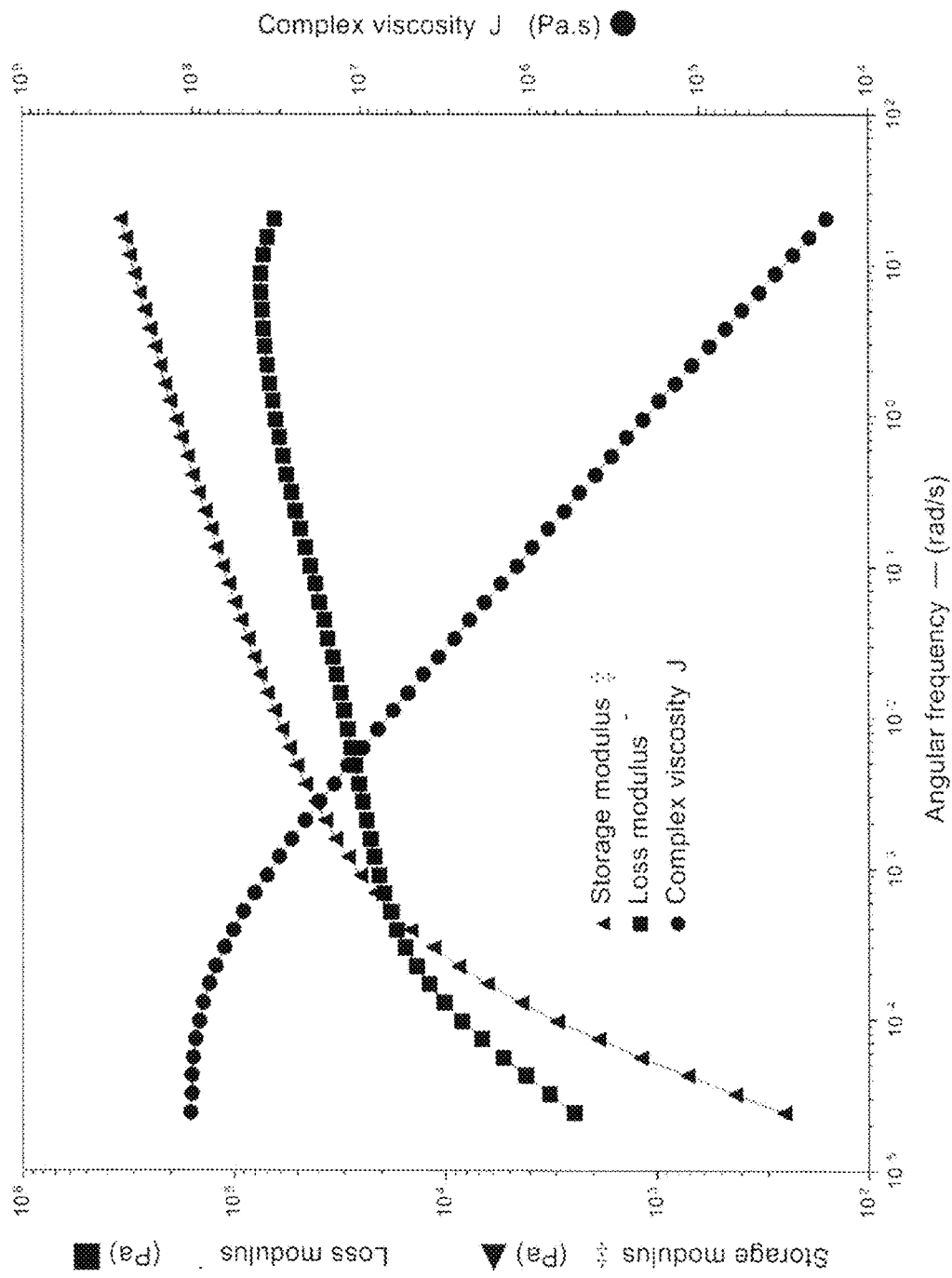
Figure 7:
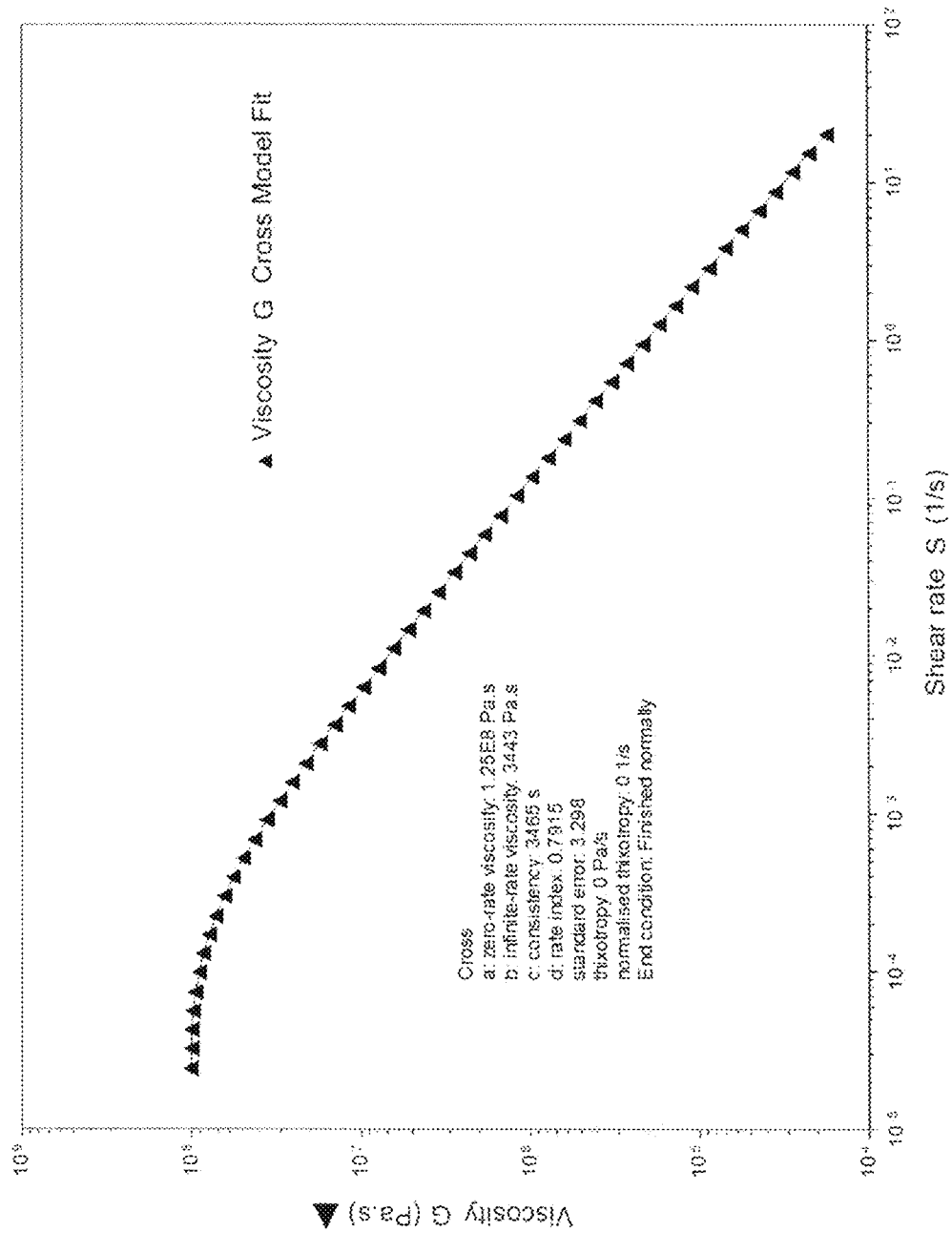

FIG. 6 is an experimental data plot of Complex Viscosity ($\eta^*$), Storage Modulus (G') and Loss Modulus (G") versus Angular Frequency ($\omega$) for the poly (ethylene tetrafluoroethylene) (ETFE) polymer of Example 1 in accordance with an embodiment; and FIG. 7 is a Flow Curve fitted to the Cross Flow Model for the poly (ethylene tetrafluoroethylene) (ETFE) polymer of Example 1 in accordance with an embodiment.

GLOSSARY

As used herein, the term "ETFE" refers to ethylene tetrafluoroethylene fluoropolymer or polyethylene tetrafluoroethylene).

As used herein, the phrases "high degree of crystallinity" or "highly crystalline" are meant to describe an ETFE polymer that has a first melt enthalpy greater than about 57 J/g as measured by differential scanning calorimetry (DSC).

As used herein, a node may be described as a larger volume of polymer, and is where a fibril originates or terminates with no clear continuation of the same fibril through the node. A fibril may have a width of less than about 250 nm, or less than about 150 nm.

As used herein, the term "dense" is meant to describe an ETFE polymer preform, membrane, or article that has a porosity of less than about 10%.

As used herein, the term "lubricant" is meant to describe a processing aid that includes, and in some embodiments, consists of, an incompressible fluid that is not a solvent for the polymer at processing conditions. The fluid-polymer surface interactions are such that it is possible to create a homogenous mixture.

As used herein, the term "cohesive" is meant to describe a tape or precursor material that is sufficiently strong for further processing.

As used herein, the term "uniaxial" is meant to describe a polymer, tape, membrane, preform, or article that is expanded in only one direction.

As used herein, the term "biaxial" is meant to describe a polymer, tape, membrane, preform, or article that is expanded in at least two directions.

As used herein, the terms "melting point", "melting temperature", and "melt temperature" are meant to define the peak of the melt endotherm as measured by differential scanning calorimetry (DSC) during the heating of the ETFE polymer.

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the figures should not be construed as limiting.

The invention relates to poly(ethylene tetrafluoroethylene) (ETFE) polymers that have an average molecular weight (Mw) of at least about 300,000 g/mol and a high degree of crystallinity and tapes, membranes, fibers, and articles made therefrom. In exemplary embodiments, the average molecular weight of the ETFE polymer is between about 300,000 g/mol and about 20,000,000 g/mol, between about 500,000 g/mol and about 20,000,000 g/mol, between about 1,000,000 g/mol and about 20,000,000 g/mol, or between about 2,000,000 g/mol and about 20,000,000 g/mol. The crystallinity of the ETFE polymer may be measured by differential scanning calorimetry (DSC). As used herein, the phrases "high degree of crystallinity" or "highly crystalline" are meant to describe an ETFE polymer that has a melt enthalpy greater than about 57 J/g as measured by DSC. In addition, the ETFE polymer may contain a trace amount of at least one additional comonomer.

The poly(ethylene tetrafluoroethylene) (ETFE) polymers have a melting point from about 260° C. to about 300° C. It is to be noted that the terms "melting temperature", "melt temperature", and "melting point" may be used interchangeably herein. In at least one exemplary embodiment, the ETFE polymer has a melting point of approximately 293° C.

ETFE tapes, ETFE membranes, ETFE fibers, and ETFE articles may have a percent porosity that is greater than about 10%, greater than or equal to about 15%, greater than or equal to about 20%, greater than or equal to about 25%, greater than or equal to about 30%, greater than or equal to about 35%, greater than or equal to about 40%, greater than or equal to about 45%, greater than or equal to about 50%, greater than or equal to about 55%, greater than or equal to about 60%, greater than or equal to about 65%, greater than or equal to about 70%, greater than or equal to about 75%, greater than or equal to about 80%, greater than or equal to about 85%, or up to (and including) 90%. In exemplary embodiments, the ETFE tape, membrane, fiber, or article may have a percent porosity from about 10% to about 90%, from about 25% to about 90%, from about 30% to about 90%, from about 40% to about 90%, from about 50% to about 90%, or from about 60% to about 90%, from about 25% to about 75%, or from about 25% to about 50%.

The ETFE resin may be provided in a particulate form, for example, in the form of a powder. ETFE powders are formed of individual ETFE particles having a particle size less than about 500 nm. With ETFE polymers, the particle size, shape, and distribution thereof are important to obtain the desired porous structures. These particle characteristics affect the packing density as well as connection density, thereby affecting the porous structures that can be produced from the ETFE particles.

In one embodiment, to form a porous article from an ETFE polymer, the ETFE polymer is first mixed with a lubricant, such as a light mineral oil. Other suitable lubricants include aliphatic hydrocarbons, aromatic hydrocarbons, halogenated hydrocarbons, and the like, and are selected according to flammability, evaporation rate, and economical considerations. It is to be appreciated that the term "lubricant", as used herein, is meant to describe a processing aid consisting of an incompressible fluid that is not a solvent for the polymer at the process conditions. The choice of lubricant is not particularly limiting and the selection of lubricant is largely a matter of safety and convenience. The fluid-polymer surface interactions are such that it is possible to create a homogenous mixture. The lubricant may be added to the ETFE polymer in a ratio 1 ml/100 g to about 100 ml/100 g or from about 10 ml/100 g to about 70 ml/100 g.

Once the lubricant is added, the mixture is maintained below the melt temperature of the ETFE polymer for a period of time sufficient to wet the interior of the clusters of the ETFE polymer with the lubricant. A "sufficient period of time" may be described as a time period sufficient for the ETFE particles to return to a free-flowing powder. It is to be noted that prior to wetting the interior of the ETFE polymer clusters, the lubricant/polymer mixture is a wet, viscous mass.

In at least one embodiment, the mixture is heated to a temperature below the melt temperature of the ETFE polymer or the boiling point of the lubricant, whichever is lower, it is to be appreciated that various times and temperatures may be used to wet the ETFE polymer so long as the lubricant has a sufficient time to adequately wet the interior of the ETFE polymer clusters.

Once lubricated, the ETFE polymer particles can be formed into solid shapes, (e.g., fibers, tubes, tapes, sheets, and/or three dimensional self-supporting structures) without exceeding the melt temperature of the ETFE polymer. The lubricated particles are heated to a point below the melting temperature of the polymer and with the application of sufficient pressure and shear to form inter-particle connections and create a solid form. Non-limiting examples of methods of applying pressure and shear include ram extrusion (e.g., typically called paste extrusion or paste processing when lubricant is present) and optional calendering to form a cohesive, flexible, porous tape having a node and fibril structure.

In one exemplary embodiment, the lubricated ETFE polymer is ram extruded to produce a cohesive, flexible, porous tape having a node and fibril structure. As used herein, the term "cohesive" is meant to describe a tape that is sufficiently strong for further processing. The extrusion occurs at a temperature that is about 220° C. or less below the melt temperature of the ETFE polymer. In some embodiments, the extrusion occurs at a temperature that is about 200° C. or less, or that is about 100° C. or less, below the melt temperature of the ETFE polymer. The ETFE tape has an indeterminate length and a thickness less than about 4 mm. Tapes may be formed that have a thickness from about 0.01 mm to about 4 mm, from about 0.01 mm to about 3 mm, from about 0.01 mm to about 2 mm, from about 0.01 mm to about 1 mm, from about 0.08 mm to about 0.5 mm, or from 0.05 mm to 0.2 mm, or even thinner. In at least one embodiment, the ETFE tape has a thickness from about 0.05 mm to about 0.2 mm.

In a subsequent step, the lubricant may be removed from the porous ETFE tape. In instances where a mineral oil is used as the lubricant, the lubricant may be removed by washing the tape in hexane or other suitable solvent. The wash solvent is chosen to have excellent solubility for lubricant and sufficient volatility to be removed below the melting point of the resin. If the lubricant is of sufficient volatility, the lubricant may be removed without a washing step, or it may be removed by heat and/or vacuum. The ETFE tape is then optionally permitted to dry, typically by air drying. However, any conventional drying method may be used as long as the temperature of the sample remains below the melting point of the ETFE polymer.

The ETFE tapes, once dried, may be cut to suitable sizes for expansion. Expansion of these samples occurs at temperatures that are about 220° C. or less below the melt temperature of the EPTFE polymer, about 200° C. or less below the melt temperature, or about 100° C. or less below the melt temperature. The samples may be expanded in one or more directions to form a porous membrane. Expansion, either uniaxial or biaxial, may be conducted at engineering strain rates (ERS) up to 20,000%/second, or from 1% to 20,000%/second to form an expanded porous ETFE article (e.g., expanded ETFE membrane). The expanded ETFE article has a structure of nodes and fibrils. It is believed that an increase in strength concurrently occurs upon expansion. The increase in strength of the polymer matrix is dependent upon the strength of the tape prior to expansion, the quality of the resin (e.g., particle size, molecular weight, distribution of particle size and/or molecular weight, degree of crystallinity, composition of polymer, and the like) the temperature at which expansion is performed, the rate of expansion, and the total amount of expansion.

In another embodiment, the ETFE polymer may be subjected to pressure at a temperature that is about 220° C. or less below the melt temperature of the ETFE polymer (e.g., calendered) without the addition of a lubricant to form a dense preform (e.g., a dense ETFE tape). The preform may be subsequently slit in a length direction and stretched to form a dense ETFE fiber. The dense preform and the dense fiber have a porosity less than about 10%.

Test Methods

It should be understood that although certain methods and equipment are described below, other methods or equipment determined suitable by one of ordinary skill in the art may be alternatively utilized. It is to be understood that the following examples were conducted on a lab scale but could be readily adapted to a continuous or semi-continuous process.

Thickness Measurement

Thickness was measured by placing the sample between the two plates of a Miyutoyo thickness gauge (Miyutoyo Corporation, Kawasaki, Japan). The average of the multiple measurements was reported.

Percent Porosity Calculation

Density was used to calculate the percent porosity of expanded materials using 1.8 g/cc as the full density of the sample. The volume of each sample was determined. Each sample was weighed using an AND Model HF 400 balance, and then the thickness of the samples was taken using a Miyutoyo thickness gauge (Miyutoyo Corporation, Kawasaki, Japan). Using this data, a density of the sample can be calculated with the following formula:

$$\rho = \frac{m}{v}$$

where: ρ=density (g/cc)
m=mass (g); and
v=volume
Porosity was calculated as:

$$P = 100 \cdot \left(1 - \frac{\rho_{bulk}}{\rho}\right)$$

where: P=% porosity
$\rho_{bulk}$=bulk density of the sample (g/cc); and
ρ=true density.

SEM Method

The SEM samples were imaged at 1.0 to 3.0 kV using an Hitachi SU 8000 Field Emission scanning electron microscope with mixed Upper and Lower Second Electron detectors.

DSC Measurement

DSC data were collected using a TA Instruments Q2000 DSC between −50° C. and 350° C. using a heating rate of 10° C./min. Approximately 5 to 10 mg of the sample was placed into a standard Tzero pan and lid combination available from TA Instruments. A linear integration method from 200° C. to 310° C. was used to integrate to obtain the first melt enthalpy data.

Molecular Weight (Mw) Determination for the poly (ethylene tetrafluoroethylene) (ETFE) polymer of Example 1

The molecular weight (Mw) of the poly (ethylene tetrafluoroethylene) (ETFE) polymer of Example 1 was calculated by using the following Equation (1):

$$\eta_0 = \frac{G_N}{1.7} K_\lambda M w^{3.4} \text{(Berry, G.C.; Fox, T.G. 1968)} \quad \text{Equation (1)}$$

$\eta_0$=melt zero-shear viscosity (Pa·s)

$\frac{G_N}{1.7} K_\lambda$ = the front fractor,
$Ke^{(Wasserman, S.H.; Graessley, W. 1996)}$, $K_\lambda$=constant front factor in Mw relation to longest relaxation time=1.08 $e^{-21 (Tuminello, W. H. 1993)}$ In Equation (1), the melt zero-shear viscosity, $\eta_0$ and the front factor, Ke were determined from experimental rheology data as follows. The experimental data plot of Complex Viscosity (η*), Storage Modulus (G') and Loss Modulus (G") versus Angular Frequency (ω) was generated at 320° C. using the oscillatory frequency sweep method in a strain controlled rheometer (Model: ARES-G2 rheometer, TA Instruments, New Castle, Del.). FIG. 6 shows such a plot for the poly (ethylene tetrafluoroethylene) (ETFE) polymer of Example 1.

Using the Cox-Merz rule$^{(Cox, W. P.; Merz, E. H. 1958)}$, the experimental data plot of FIG. 6 was transformed mathematically into a plot of Viscosity (η) versus Shear Rate ($\dot{\gamma}$) also referred to as the Flow Curve. The Flow Curve was then fitted to the Cross flow model to yield the melt zero-shear viscosity according to the following Equation (2):

$$\frac{\eta - \eta_\infty}{\eta_0 - \eta_\infty} = \frac{1}{1 + (k\dot{\gamma})^n} \quad \text{(Cross, M.M. 1965)} \quad \text{Equation (2)}$$

$\eta_0$=melt zero-shear viscosity (Pa·s)
$\eta_\infty$=infinite viscosity (Pa·s)
k=consistency (s)
n=power law index.

The Flow Curve and the Cross Flow model fit for the poly (ethylene tetrafluoroethylene) (ETFE) polymer of Example 1 is shown in FIG. 7. Using the Flow Curve and the Cross flow model fit, the following parameters were calculated from FIG. 7 and reported in Table A.

TABLE A

| | |
|---|---|
| $\eta_0$ | 1.25E$^8$ Pa·s |
| $\eta_\infty$ | 3443 Pa s |
| k | 36060 s |
| n | 0.9944 |

From FIG. 6, the value of Storage Modulus (G') at an angular frequency of 10 rad/sec was used as the value of $G_N$, which in turn was used in calculating the front factor, Ke. The values for $G_N$ and Ke were determined to be 3.14E05 Pa and 1.99E-15, respectively.

Using the above value for Ke and the value for melt zero-shear viscosity from Table A, the molecular weight (Mw) of the poly (ethylene tetrafluoroethylene) (ETFE) polymer of Example 1 was calculated to be 9,998,000 g/mol.

EXAMPLES

Example 1

To a microfluidizer (Model Number 7125-20, Microfluidics Corporation) was added 0.225 kg of a non-telogenic perfluorinated dispersing agent, 1.5 kg of 3M™ Novec™ HFE-7100 fluid and 5 kg of deionized (DI) water. This mixture was emulsified until the raw dispersion particle size of the mixture was 545 nm.

To a 50-liter horizontal polymerization reactor equipped with a 3-bladed agitator was added the above micro-emulsified solution, 23 kg of DI water, 5 g of oxalic acid, and 15 g of ammonium oxalate. The reactor was repeatedly evacuated and pressurized (to about 1 Atm or less) with TFE until the oxygen level was reduced to 20 ppm or less. The contents were briefly agitated at about 60 rpm between evacuation and purge cycles to ensure that the water was deoxygenated.

The reactor was cooled to 10° C. and agitated at 60 rpm. Subsequently, 1.4 MPa of TFE was added followed by addition of 0.9 MPa of ethylene. At this time, KMnO$_4$ in a DI water solution (0.3 g/L) was injected at 40 g/min until there was a drop in pressure by 5 kPa. Then, the KMnO$_4$ injection rate was reduced to 20 g/min. After every 200 kPa drop in pressure, 100 kPa of TFE and 100 kPa of ethylene were added back into the reactor to maintain a steady pressure. After a total of 400 kPa of pressure drop was observed, the KMnO$_4$ injection rate was lowered to 12 g/min. After a total of 600 kPa of pressure drop was observed, the KMnO$_4$ injection rate was lowered to 8 g/min. After a total of 1000 kPa of pressure drop was observed, the KMnO$_4$ injection was stopped.

After consumption of 1.8 kg of TFE, no more KMnO$_4$ solution was added into the reactor. After a total of 5 kg of TFE was added to the reactor, the reaction was stopped by evacuating the remaining monomers. Over the course of the reaction, the temperature in the reactor exothermed (increased) from a starting point of 10° C. up to 40° C.

The total polymerization time was 115 min. The weight of the dispersion produced was 36.44 kg containing 19.44% solids. The dispersion was coagulated with nitric acid and dried at 130° C.

Figure 1:
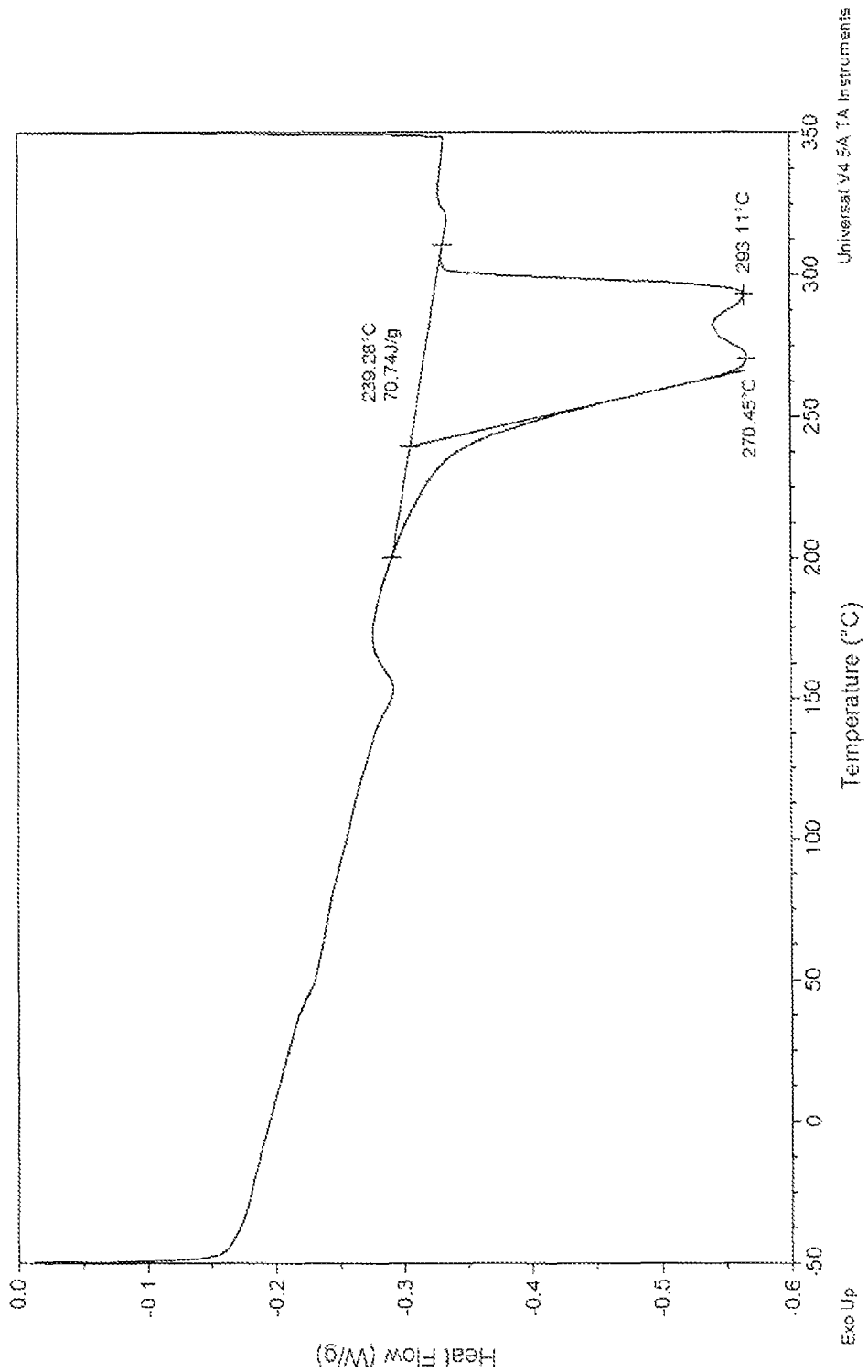
FIG. 1 is a differential scanning calorimetry (DSC) thermogram of the ETFE polymer of Example 1 depicting a bimodal melting distribution in accordance with one exemplary embodiment.

The raw dispersion particle size (RDPS) of the polymer particle was 0.272 microns. The density of the poly (ethylene tetrafluoroethylene) (ETFE) polymer was measured by helium pycnometry and was determined to be 1.80 g/cc. A differential scanning calorimetry (DSC) thermogram of the ETFE polymer is shown in FIG. 1. As shown in FIG. 1, a bimodal melting distribution was observed, with the peak of the lower melt temperature occurring at 270° C. and a higher melt temperature occurring at 293° C. The melt enthalpy was determined to be 71 J/g. These results are consistent with reported literature for an alternating 50:50 ETFE polymer.[Arai, et al, Polymer 51(2010) 4831-4835]

The molecular weight of the ETFE polymer was calculated to be 9,998,000 g/mol.

Example 2

100 g of the poly (ethylene tetrafluoroethylene) (ETFE) polymer from Example 1 was mixed with 58 g of a perfluorocarbon liquid (FLUTEC PP11, F2 Chemicals Ltd., U.K.). The above blend was then placed into a barrel having a diameter of 2.54 cm. The barrel was sealed and heated in an oven to 125° C. for 2.5 hours and then pelletized at a pressure of 750 psi. The pellet was then placed back into the oven at 125° C. for an additional 2 hours. The lubricated pellet was then extruded at a ram rate of 0.254 cm/sec through a die having a 30 degree inlet angle and a diameter of 8 mm.

Figure 2:
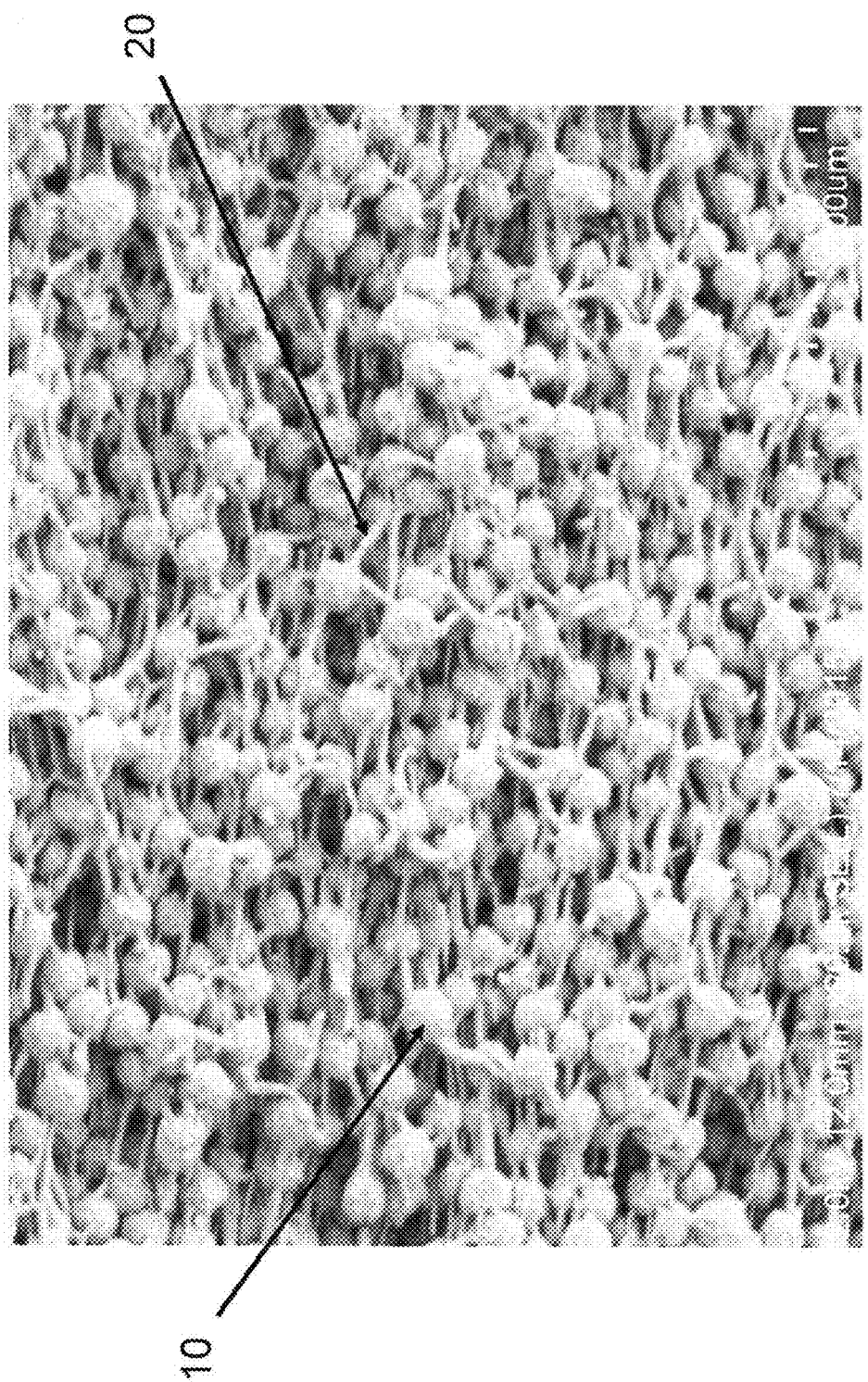
FIG. 2 is a scanning electron micrograph (SEM) of the surface of the porous beading article of Example 2 taken at magnification of 20,000× according to at least one exemplary embodiment.

The extrudate was dried for 1 hour at 150° C. in a convection oven. The resultant beading article had a density of 1.26 g/cc. The porosity of the beading article was determined to be 30%. A scanning electron micrograph (SEM) of the surface of the interior of the porous beading article taken at a magnification of 20,000× is shown in FIG. 2. The SEM shows that the beading article has a structure of nodes 10 and fibrils 20.

Example 3

1107 g of poly (ethylene tetrafluoroethylene) (ETFE) polymer from Example 1 was mixed 726 g of a perfluorocarbon liquid (FLUTEC PP11, F2 Chemicals Ltd., U.K.) to form a blend. The blend was heated for 2 hours at 150° C. The heated blend was then placed into a barrel having a diameter of a 6.35 cm and was pelletized at a pressure of 1450 psi. The resulting lubricated pellet was then placed back into the oven at 150° C. for an additional 3 hours. The lubricated pellet was then extruded at an extrusion rate of 1.09 cm/sec through a die having a width of 15.24 cm and a thickness of 0.38 cm to form an ETFE tape.

Figure 3:
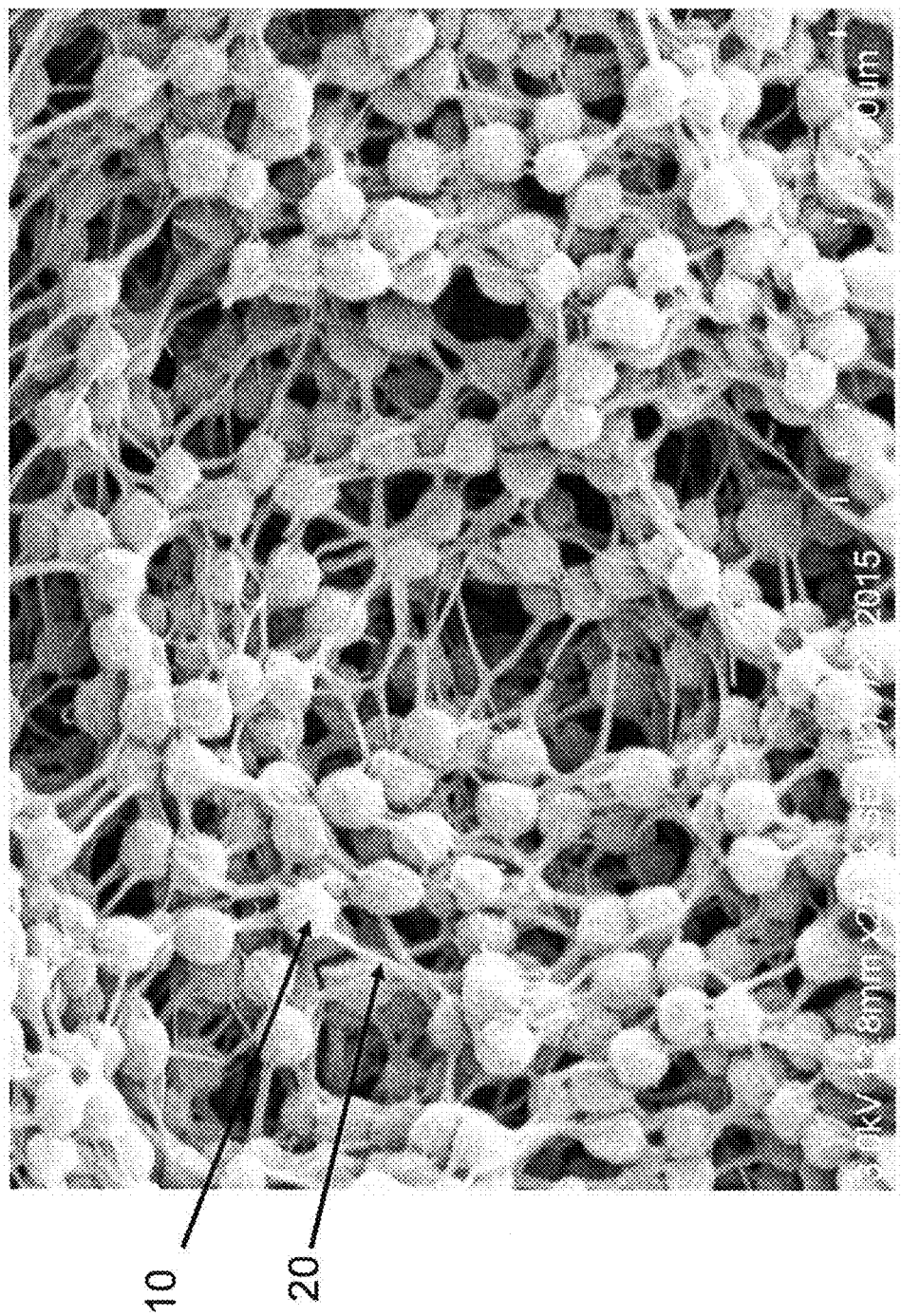
FIG. 3 is a scanning electron micrograph (SEM) of the surface of the interior of the porous ETFE tape of Example 3 taken at a magnification of 25,000× showing a node and fibril structure in accordance with one embodiment.

The ETFE tape was dried overnight at 150° C. in a convection oven. The porous ETFE tape had a density of 1.05 g/cc. The porosity of the tape was determined to be 40%. A scanning electron micrograph (SEM) of the surface of the interior of the porous ETFE tape taken at a magnification of 25,000× is shown in FIG. 3. As seen in FIG. 3, the ETFE tape has a structure of nodes 10 interconnected by fibrils 20.

Example 4

To a microfluidizer (Model Number 7125-20, Microfluidics Corporation) was added 0.098 kg of a non-telogenic perfluorinated dispersing agent, 1.2 kg of 3M™ Novec™ HFE-7100 fluid and 5 kg of deionized (DI) water. This mixture was emulsified until the raw dispersion particle size of the mixture was 585 nm.

To a 50-liter horizontal polymerization reactor equipped with a 3-bladed agitator was added the above micro-emulsified solution, 23 kg of DI water, 2 g of oxalic acid, and 15 g of ammonium oxalate. The reactor was repeatedly evacuated and pressurized (to about 1 Atm or less) with TFE until the oxygen level was reduced to 20 ppm or less. The contents were briefly agitated at about 60 rpm between evacuation and purge cycles to ensure that the water was deoxygenated.

The reactor was cooled to 25° C. and agitated at 60 rpm. Subsequently, 1.5 MPa of TFE was added followed by addition of 1.0 MPa of ethylene. At this time, $KMnO_4$ in a DI water solution (0.3 g/L) was injected at 40 g/min.

After every 200 kPa drop in pressure, 100 kPa of TFE and 100 kPa of ethylene were added back into the reactor to maintain a steady pressure. After consumption of 4.0 kg of TFE, no more $KMnO_4$ solution was added into the reactor and the reaction was stopped by evacuating the remaining monomers.

The total polymerization time was 118 min. The weight of the dispersion produced was 35.81 kg containing 13.81% solids. The dispersion was coagulated with nitric acid and dried at 130° C.

The raw dispersion particle size (RDPS) of the polymer particle was determined to be 0.181 microns.

Figure 4:
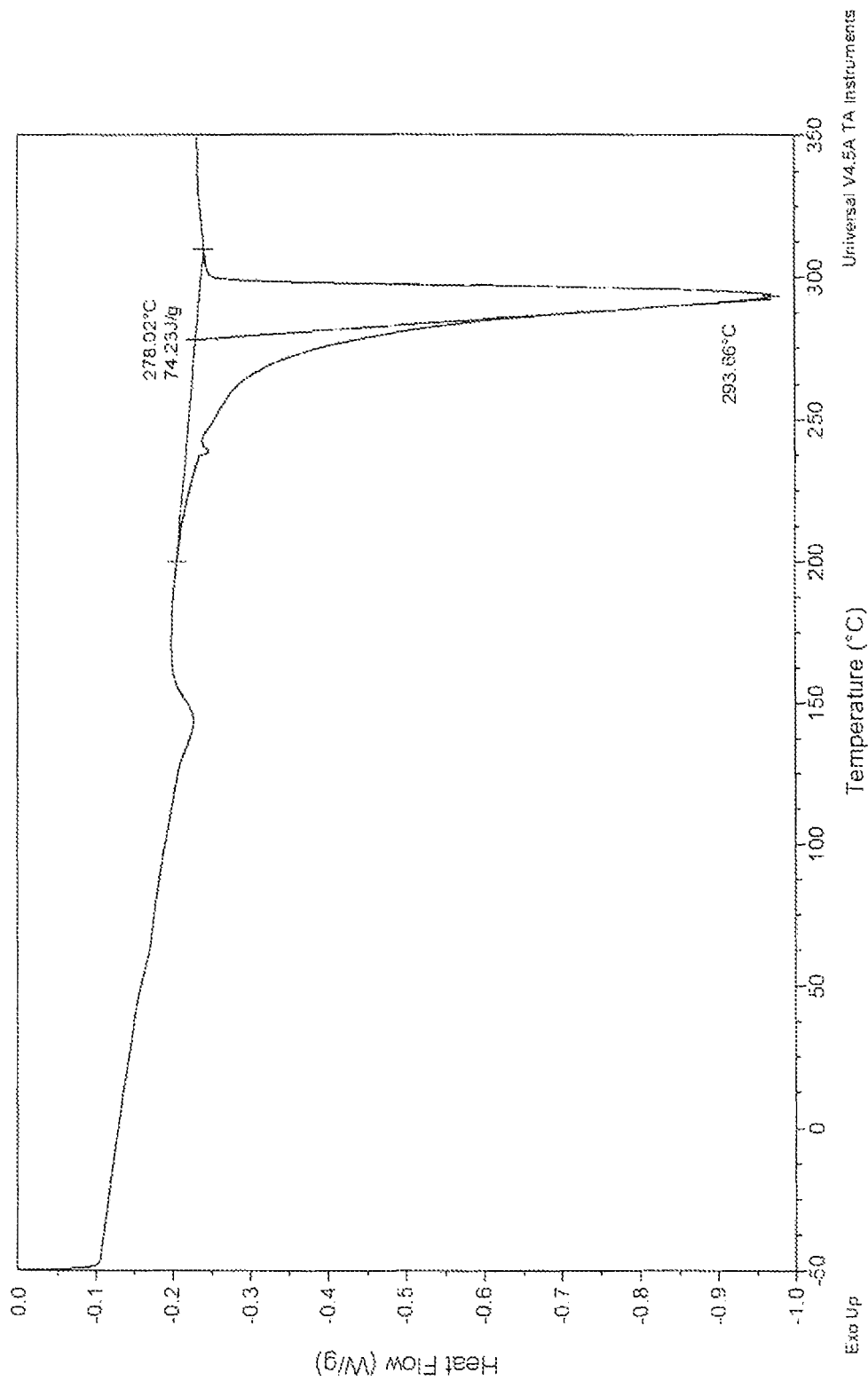
FIG. 4 is a differential scanning calorimetry (DSC) thermogram of the ETFE polymer of Example 4 according to one embodiment of the invention.

The density of the poly (ethylene tetrafluoroethylene) (ETFE) polymer was measured by helium pycnometry and was determined to be 1.75 g/cc. A differential scanning calorimetry (DSC) thermogram of the ETFE polymer is shown in FIG. 4. As shown in FIG. 4, the melt temperature of the ETFE polymer is about 293° C. The melt enthalpy was determined to be 74 J/g. These results are consistent with reported literature for an alternating 50:50 ETFE polymer.[Arai, et al Polymer 51(2010) 4831-4835]

Example 5

The rolls on a calendaring machine were heated to 270° C. with a 1 mil gap between two rolls having a 304 mm diameter. With the rolls moving at a rate of 2 feet per minute, dry ETFE resin from Example 4 that had been pre-heated to 270° C. was placed in the rolls. A clear, strong tape was obtained.

Example 6

A one quarter inch strip from the ETFE tape of Example 5 was cut in the machine direction. This strip was then heated at 150° C. for 15 minutes. Starting from a gage length of 25.4 mm, the material was stretched to 56 mm at a rate of 5000 mm/s, giving an expansion ratio of 2.2:1 to form an ETFE fiber.

Figure 5:
FIG. 5 is a scanning electron micrograph (SEM) of the surface of the interior of the drawn ETFE fiber of Example 6 taken at a magnification of 50,000× in accordance with an embodiment.

A scanning electron micrograph (SEM) of the surface of the interior of the drawn ETFE fiber taken at a magnification of 50,000× of the drawn ETFE fiber is shown in FIG. 5.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents

What is claimed is:

1. A process for making a dense article comprising:
providing particles of poly(ethylene tetrafluoroethylene) (ETFE) resin having an average molecular weight greater than 500,000 g/mol, a melting point from about 260° C. to about 300° C., and a melt enthalpy of at least 57 J/g; and
calendering said particles at a temperature below the melt temperature of said ETFE resin to form a dense ETFE polymer article having a porosity of less than about 10%.

2. The process of claim 1, wherein said calendering occurs in the absence of a lubricant.

3. The process of claim 1, further comprising slitting said dense ETFE polymer article in a length direction to form a slit preform; and
stretching the slit preform to form an ETFE polymer fiber.

4. The process of claim 1, wherein said particles have an average molecular weight greater than 500,000 g/mol and up to about 20,000,000 g/mol.

5. A dense poly(ethylene tetrafluoroethylene) (ETFE) article comprising:
an ETFE polymer membrane comprising an ETFE resin and having a porosity less than about 10%,
wherein said ETFE resin has an average molecular weight greater than 500,000 g/mol, a melting point from about 260° C. to about 300° C., and a melt enthalpy of at least 57 J/g.

6. The dense article of claim 5, wherein said ETFE polymer solid shape is an ETFE tape.

7. The dense article of claim 6, wherein said ETFE polymer solid shape is an ETFE fiber.

8. The dense article of claim 5, wherein said particles have an average molecular weight greater than 500,000 g/mol and up to about 20,000,000 g/mol.

9. A method for making a poly(ethylene tetrafluoroethylene) (ETFE) copolymer fiber that comprises:
subjecting particles of an ETFE copolymer having an average molecular weight greater than 500,000 g/mol, a melting point from about 260° C. to about 300° C., and a melt enthalpy of at least 57 J/g to pressure at a first temperature-below the melt temperature of the ETFE copolymer to form a preform which has a porosity less than about 10%,
slitting the preform in a length direction, and
stretching the slit preform into an ETFE copolymer fiber at a second temperature below the melt temperature of the ETFE copolymer.

10. The method of claim 9, wherein said ETFE copolymer includes from about 0.001 mol % to about 10 mol % of an additional comonomer.

11. The method of claim 9, wherein said particles have an average molecular weight greater than 500,000 g/mol and up to about 20,000,000 g/mol.

\* \* \* \* \*